(12) United States Patent
Ruggerio

(10) Patent No.: US 8,949,987 B2
(45) Date of Patent: Feb. 3, 2015

(54) COMPUTER SECURITY PROCESS MONITOR

(75) Inventor: Raymond L. Ruggerio, Glenview, IL (US)

(73) Assignee: Alcatel Lucent, Boulogne-Billancourt (FR)

( * ) Notice: Subject to any disclaimer, the term of this patent is extended or adjusted under 35 U.S.C. 154(b) by 728 days.

(21) Appl. No.: 12/652,851

(22) Filed: Jan. 6, 2010

(65) Prior Publication Data

US 2011/0167491 A1  Jul. 7, 2011

(51) Int. Cl.
*G06F 11/00* (2006.01)
*G06F 21/55* (2013.01)

(52) U.S. Cl.
CPC ............ *G06F 21/552* (2013.01); *G06F 21/55* (2013.01)
USPC .............................................. 726/23; 726/25

(58) Field of Classification Search
CPC ................................ G06F 21/55; G06F 21/552
USPC ....................................................... 726/23, 25
See application file for complete search history.

(56) References Cited

U.S. PATENT DOCUMENTS

| 7,089,428 | B2 * | 8/2006 | Farley et al. | 726/22 |
| 7,530,106 | B1 * | 5/2009 | Zaitsev et al. | 726/24 |
| 2003/0149887 | A1 * | 8/2003 | Yadav | 713/200 |
| 2004/0230834 | A1 * | 11/2004 | McCallam | 713/201 |
| 2008/0127345 | A1 * | 5/2008 | Holtmanns et al. | 726/23 |
| 2013/0047039 | A1 * | 2/2013 | Manes et al. | 714/47.1 |

FOREIGN PATENT DOCUMENTS

WO  WO 2009097610 A1 *  8/2009

* cited by examiner

*Primary Examiner* — Samson Lemma
(74) *Attorney, Agent, or Firm* — Hitt Gaines, PC

(57) ABSTRACT

A computer security process monitor detects security intrusions of a networked computing platform by monitoring execution statistics associated with one or more computer processes executed by the platform in relation to expected (or "valid") execution parameters. The execution statistics in one example include system process statistics (e.g., process name, peak memory usage, maximum number of threads, peak CPU utilization) and network interface statistics (e.g., IP ports, protocols) associated with the one or more computer processes; and the valid execution parameters define acceptable values or states corresponding to the execution statistics.

16 Claims, 3 Drawing Sheets

| PROCESS NAME | PEAK MEMORY USAGE | MAX# THREADS | PEAK CPU UTILIZATION | IP PORT USAGE/PROTOCOL |
|---|---|---|---|---|
| session_mgr | 1200 kB | 110 | 45% | 5060-TCP<br>5060-UDP<br>8000-TCP |
| fault_mrg | 200 kB | 20 | 20% | 161-UDP<br>162-UDP | ical advance is
COMPUTER SECURITY PROCESS MONITOR

FIELD OF THE INVENTION

This invention relates generally to computer security and, more particularly, to the security of networked computing platforms within IP-based networks.

BACKGROUND OF THE INVENTION

One of the most important concerns in virtually all computer systems is security, i.e., the ability to protect information and system resources from intrusions from hackers, malware, viruses, worms or the like. This concern is particularly worrisome when computing platforms are networked within Internet Protocol (IP)-based networks that can be accessed by untrusted users/devices and thereby open windows of vulnerability to the computing platforms.

For example and without limitation, the IP Multimedia Subsystem (IMS) is an architectural framework for delivering converged multimedia services (e.g., voice, video, data) to end users via an IP platform. IMS components use Session Initiation Protocol (SIP) for signaling to and from various other IMS components and end users. SIP messages are ASCII based, easy to read, create and modify; and therefore vulnerable to eavesdropping, interception and spoofing by untrusted users/devices. A related problem is that IP protocols, IP addressing formats and the like are well understood and can be spoofed or modified by unscrupulous users/devices.

There are a variety of approaches to address computer security. Anti-virus software or patches can detect and eliminate threats based on characteristic patterns (or "signatures") of known threats (e.g., known viruses), or they may employ a set of heuristics or rules to detect threats based on general behaviors. Firewalls protect the perimeter of a security domain by monitoring, blocking, or proxying communications from untrusted users that are directed to components inside the firewall. Generally, however, both of these approaches require periodic updates, reconfiguration or the like to address constantly evolving numbers and types of threats and may cause some degradation of performance of the protected platform.

SUMMARY OF THE INVENTION

These problems are addressed and a technical advance is achieved in the art by a computer security process monitor, implemented in one example within an embedded IP platform that executes one or more computer processes, whereby security intrusions are detected by monitoring execution statistics associated with the processes in relation to expected (or "valid") execution parameters. The execution statistics in one example include system process statistics (e.g., process name, memory usage, number of threads, CPU utilization) and network interface statistics (e.g., IP ports, protocols) associated with the one or more computer processes; and the valid execution parameters define acceptable values or states corresponding to the execution statistics. Advantageously, the valid execution parameters are derived independent of particular threats or threat characteristics, and hence do not require periodic updates, reconfigurations or the like corresponding to evolving numbers and types of threats.

In one embodiment, there is provided a method comprising maintaining a database including indicia of valid execution parameters associated with one or more computer processes executable by a computing platform; obtaining execution statistics associated with execution of the one or more computer processes by the computing platform; and comparing the execution statistics to the valid execution parameters to detect abnormalities indicative of possible security intrusions.

In another embodiment, there is provided a computing platform comprising a system process monitor, a network interface monitor, a database and a security process monitor. The system process monitor obtains system process information associated with one or more computer processes executed by the computing platform; the network interface monitor obtains network interface information associated with the one or more computer processes; and the database includes indicia of valid execution parameters associated with the one or more computer processes. The security process monitor compares the system process information and the network interface information to the valid execution parameters to detect abnormalities indicative of possible security intrusions.

In yet another embodiment, there is provided a computer security process monitor comprising means for obtaining execution statistics associated with one or more computer processes executed by a computing platform; means for obtaining indicia of valid execution parameters associated with the one or more computer processes; and means for comparing the execution statistics to the valid execution parameters to detect abnormalities indicative of possible security intrusions.

BRIEF DESCRIPTION OF THE DRAWINGS

The foregoing and other advantages of the invention will become apparent upon reading the following detailed description and upon reference to the drawings in which:

FIG. 2 is an exemplary data arrangement of expected (or "valid") execution parameters associated with computer processes executable by a computing platform.

DESCRIPTION OF THE PREFERRED EMBODIMENT(S)

Figure 1:
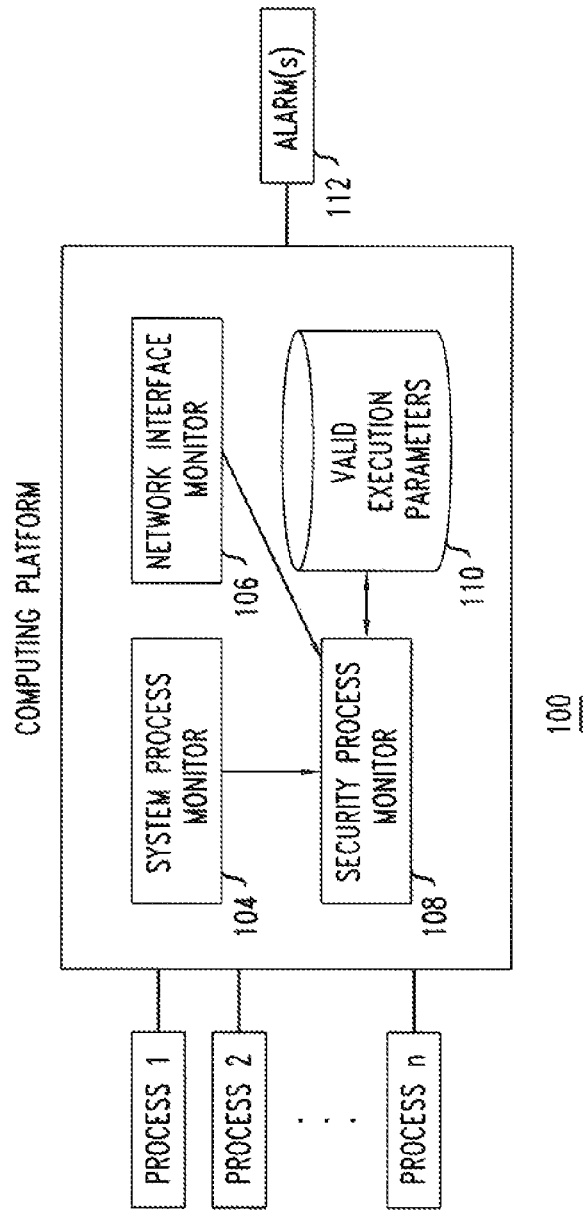
FIG. 1 is a block diagram of a computing platform including a computer security process monitor according to an embodiment of the invention.

FIG. 1 shows an exemplary computer system 100 comprising a computing platform 102 configured to execute one or more computer processes ("Process 1," "Process 2," Process "n"). In one embodiment, the computing platform 102 comprises an embedded platform that is networked within an Internet Protocol (IP)-based network (for example and without limitation, an IP Multimedia Subsystem (IMS) network); and the processes that are configured to run are known corresponding to known characteristics and functionality of the embedded platform. For example and without limitation, the known characteristics and functionality of the embedded platform may be determined by provisioned parameters such as the particular product/software release and/or its loading parameters (e.g., number of subscribers supported by the platform) or the like. The provisioned parameters are known at time of initialization of the platform and generally do not change throughout the period of operation of the platform, although they are subject to change (albeit infrequently) if/when the platform is re-initialized with product/software updates, reconfigured loading parameters or the like.

As shown, the computing platform 102 includes a system process monitor 104 and network interface monitor 106 for compiling various execution statistics associated with execution of the one or more computer processes. In one example, the execution statistics comprise system process information obtained from the system process monitor 104 and network interface information obtained from the network interface monitor 106 coincident to execution of the one or more computer processes.

For example and without limitation, the system process monitor 104 may compile system process information including names of one or more processes that are being executed and for each process, the memory usage, number of threads and processor utilization (e.g., CPU utilization); and the network interface monitor 106 may compile network interface information such as indicia of IP ports and protocol being used by the respective processes.

In one embodiment, the system process monitor 104 and network interface monitor 106 are implemented using basic utilities known in the art for compiling execution statistics. For example, the system process monitor 104 may consist of the utility known as "Task Manager" in Microsoft Windows or "System Monitor" in some Linux distributions, which are known to provide a list of processes running in the system, the amount of CPU, memory, and other key resources that are being used; and the network interface monitor 106 may consist of the "Netstat" utility which is known to provide information associated with usage of an IP network interface including IP ports and protocols being used, and a list of active processes communicating over the ports. IP protocols may comprise, for example Transmission Control Protocol (TCP) or User Datagram Protocol (UDP); and IP ports may comprise port numbers (e.g., 0 through 1023) allocated by the Internet Assigned Numbers Authority (IANA).

The computing platform 102 further includes a security process monitor 108 and a valid execution parameter database 110. In one embodiment, the security process monitor 108 obtains execution statistics from the system process monitor 104 and network interface monitor 106 and compares the execution statistics to valid execution parameters obtained from the valid execution parameter database 110 to detect abnormalities that may indicate security intrusions and/or malfunctions associated with execution of the processes. In one embodiment, as a result of the comparison, the security process monitor 108 can detect an invalid process from the execution statistics and/or an invalid parameter that is not consistent with the valid execution parameters and therefore may be indicative of a security intrusion.

For example, consider the case of a malware program that attaches itself to a valid system or application program. In such case, the process name is not changed, and on the surface a security intrusion is not detected. However, the execution statistics associated with the malware program may reveal abnormalities (i.e., differences from the valid execution parameters) that are indicative of a security intrusion. As will be appreciated, principles of the present invention may also be used to detect abnormalities in valid processes. For example, the detection of an invalid parameter of an otherwise valid process may be indicative of an abnormality such as a "memory leak" (i.e., where the memory used exceeds the expected value) or other malfunction.

The valid execution parameter database 110 includes one or more instances of expected (or "valid") execution parameters corresponding to one or more execution statistics. As will be appreciated, the valid execution parameters may be expressed in a variety of different ways depending on the characteristics of the parameter. For example and without limitation, the valid execution parameters may include text, numerical values, percentages or states; and numerical values and percentages may represent nominal expected values, ranges of values, or minimum or maximum threshold values associated with a particular parameter.

The computer system 100 further includes one or more alarms 112 operably connected to the computing platform to provide alarms/alerts, where appropriate, on condition of the security process monitor detecting an invalid process and/or invalid parameter. Alternatively or additionally, the computer system may record instances of invalid processes or parameters in a log file or the like.

FIG. 2 is an exemplary data arrangement 200 of expected (or "valid") execution parameters associated with computer processes executable by a computing platform. The data arrangement 200 may comprise, for example and without limitation, a list or table of valid execution parameters retrieved from the valid execution parameters database 110. Alternatively or additionally, the data arrangement 200 may include individual instances of valid execution parameters retrieved from the valid execution parameters database 110.

In one embodiment, the data arrangement 200 includes a process name field 202, peak memory usage field 204, maximum threads field 206, peak CPU utilization field 208, and IP port/protocol field 210 and records 220, 230 corresponding to one or more computer processes executable by the computing platform. The process name field 202 includes the names of the respective processes executable by the computing platform (two shown, a session_mgr process and a fault-mrg process); the peak memory usage field indicates a peak memory usage threshold; the maximum threads field 206 indicates a maximum number of threads; the peak CPU utilization field 208 indicates a peak threshold of CPU utilization (expressed as a percentage of CPU resources); and the IP port/protocol field lists acceptable IP ports/protocols associated with the respective processes.

In particular, the data arrangement 200 indicates for the session_mgr process: 1200 kB peak memory usage, 110 threads (maximum), 45% peak CPU utilization and acceptable IP ports 5060 (for TCP or UDP protocols) or 8000 (for TCP protocol); and for the fault-mrg process: 200 kB peak memory usage, 20 threads (maximum), 20% peak CPU utilization and acceptable IP ports 161 or 162 (UDP protocol).

Figure 3:
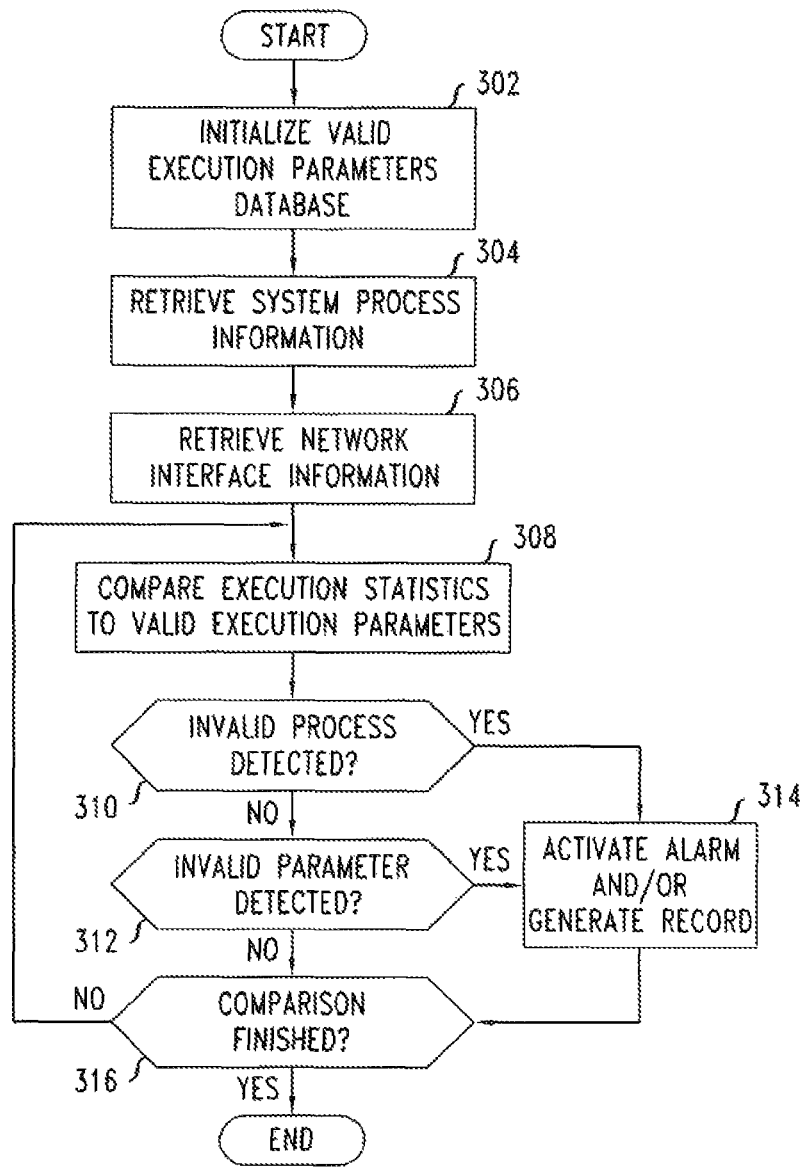
FIG. 3 is a flowchart of an exemplary method for operating a computer security process monitor to detect security intrusions of an embedded IP platform.

Turning now to FIG. 3, there is shown an exemplary method for operating a computer security process monitor to detect security intrusions of an embedded IP platform. The steps of FIG. 3 are implemented, where applicable, by the security process monitor 108 in communication with the system process monitor 104, network interface monitor 106 and valid execution parameters database 110.

The method presumes that the valid execution parameters database is populated with one or more valid execution parameters. At step 302, the valid execution parameters database is "initialized" or populated with one or more instances of valid execution parameters corresponding to characterized software/processes that the computing platform will run. Once initialized, it is contemplated that periodic updates to the valid execution parameters (e.g., corresponding to a new product/software release) may also be required to update one or more parameters and step 302 is intended to encompass both initial initialization and "re-initialization" following periodic updates. In one embodiment, following the initialization/update, the valid execution parameters database is locked with vendor specific passwords/keys, such that modifications to the parameters can not be made by users not having the passwords/keys.

In one embodiment, the security process monitor begins its operation by retrieving execution statistics, including system process information and network interface information, from the system process monitor 104 and network interface monitor 106 respectively. System process information is retrieved from the system process monitor at step 304 and network interface information is retrieved from the network interface monitor at step 306. Alternatively or additionally, execution statistics may be obtained independently by the security process monitor or may be obtained from sources other than the system process monitor or network interface monitor.

At step 308, the security process monitor compares the execution statistics to the corresponding valid execution parameters obtained from the valid execution parameters database to detect abnormalities (i.e., differences from the valid execution parameters) that may be indicative of a possible security intrusion or malfunction of a valid process. For example and without limitation, the execution statistics may indicate a process name (either explicitly or via derivation from the execution statistics) that is not registered in the list of valid processes from the valid execution parameters database, thereby defining an invalid process. The execution statistics may further reveal one or more invalid parameters other than the process name that are inconsistent with the valid execution parameters.

If an invalid process (i.e., process name) is detected, determined at step 310, the security process monitor activates an alarm and/or generates a record of the event at step 314 to provide indicia of the invalid process to an operator/user. The indicia of the invalid process may include, for example and without limitation, the process name(s) and/or parameters that are identified or suspected to be invalid by the security process monitor.

If an invalid process is not detected but an invalid parameter is detected, determined at step 312, the security process monitor activates an alarm or generates a record at step 314 to provide indicia of the invalid parameter(s) to an operator/user. The indicia of invalid parameter(s) may include, for example and without limitation, indicia of excessive memory usage (indicative of a "memory leak") associated with an otherwise valid process.

Until such time as there are no further comparisons to be made, determined at step 316, the process returns to step 308 to continue evaluating the execution statistics against the valid execution parameters. As will be appreciated, the evaluation may be performed continuously or at periodic intervals depending on the implementation.

FIGS. 1-3 and the foregoing description depict specific exemplary embodiments of the invention to teach those skilled in the art how to make and use the invention. The described embodiments are to be considered in all respects only as illustrative and not restrictive. The present invention may be embodied in other specific forms without departing from the scope of the invention which is indicated by the appended claims. All changes that come within the meaning and range of equivalency of the claims are to be embraced within their scope.

For example, the term "computing platform" as used herein is generally defined as any platform or combination of platforms, including but not limited to embedded IP platforms, that is operable to execute one or more computer processes and that is subject to potential security intrusions. As is well understood in the art, a computing platform includes respective processors and memory (not shown) for executing programming instructions residing in software code to effect certain transactions.

The term "computer process" as used herein is generally defined as an execution of instructions by the computing platform to perform a particular task or application program, or portion thereof. Each application has at least one process, most typically having a process name that corresponds to the application (e.g., Microsoft Outlook has a process named outlook.exe). Each process may consist of one or more "threads" defining separate parts of the process which may be run concurrently.

What is claimed is:

1. A method comprising:
    maintaining a database including indicia of valid execution parameters associated with one or more computer processes executable by a computing platform, the valid execution parameters being independent of a user executing the one or more computer processes;
    obtaining from the computing platform execution statistics associated with execution of the one or more computer processes on the computing platform by using a pre-existing utility of the computing platform, the step of obtaining execution statistics including obtaining system process information and network interface information associated with the execution of the one or more computer process; and
    comparing the execution statistics to the valid execution parameters to detect abnormalities between the valid execution parameters and the execution statistics that are indicative of possible security intrusions;
    wherein the system process information includes one or more of: process name, memory usage, number of threads, and CPU utilization associated with the execution of the one or more computer processes, and the network interface information includes obtaining one or more of: IP port information and indicia of IP protocol associated with the execution of the one or more computer processes.

2. The method of claim 1, wherein the step of comparing comprises:
    detecting an invalid process executed by the computing platform, the invalid process defining a process identifiable from the execution statistics that is not registered in a list of valid processes in the database.

3. The method of claim 1, wherein the step of comparing comprises:
    detecting an invalid parameter executed by the computing platform, the invalid parameter defining a parameter identifiable from the execution statistics that is not consistent with the valid execution parameters.

4. A computing platform comprising:
    a computer processor;
    a system process monitor operable to obtain from the computing platform system process information associated with one or more computer processes executed on the computing platform by using a pre-existing utility of the computing platform;
    a network interface monitor operable to obtain network interface information associated with the one or more computer processes by using the pre-existing utility of the computing platform;
    a database including indicia of valid execution parameters associated with the one or more computer processes, the valid execution parameters being independent of information about a user executing the one or more computer processes; and
    a security process monitor operably coupled to the system process monitor, network interface monitor and database, that is operable to compare the system process information and the network interface information to the valid execution parameters to detect abnormalities therebetween that are indicative of possible security intrusions, wherein the system process information includes one or more of: process name, memory usage, number of threads, and CPU utilization associated with the one or more computer processes, and the network interface information includes obtaining one or more of: IP port information and indicia of IP protocol associated with the one or more computer processes.

5. The computing platform of claim 4 comprising an embedded platform of an IMS network.

6. A computer security process monitor comprising:

circuitry for obtaining from a computing platform execution statistics associated with one or more computer processes executed on a computing platform by using a pre-existing utility of the computing platform, the execution statistics including system process information and network interface information associated with the one or more computer processes;

circuitry for obtaining indicia of valid execution parameters associated with the one or more computer processes, the valid execution parameters being independent of statistics about a user executing the one or more computer processes; and circuitry for comparing the execution statistics to the valid execution parameters to detect abnormalities between the valid execution parameters and the execution statistics that are indicative of possible security intrusions, wherein the system process information includes one or more of: process name, memory usage, number of threads, and CPU utilization associated with the one or more computer processes, and the network interface information includes obtaining one or more of: IP port information and indicia of IP protocol associated with the one or more computer processes.

7. The computer security process monitor of claim 6 wherein the execution statistics correspond to the valid execution parameters.

8. The method of claim 1 wherein the execution statistics correspond to the valid execution parameters.

9. The computing platform of claim 4 wherein the system process information and the network interface information correspond to the valid execution parameters.

10. The method of claim 1 wherein at least one of the valid execution parameters is represented as a range of values.

11. The method of claim 1 wherein at least one of the valid execution parameters is represented as a percentage.

12. The method of claim 1 wherein the valid execution parameters includes text and numerical values.

13. The method of claim 1 wherein the pre-existing utility is a basic utility of the computing platform.

14. The method of claim 1 wherein the abnormalities are based on a difference of the execution statistics from the valid execution parameters.

15. The computing platform of claim 4 wherein the pre-existing utility is a basic utility of the computing platform.

16. The computer security process monitor of claim 6 wherein the pre-existing utility is a basic utility of the computing platform.

* * * * *